United States Patent [19]  [11] 3,929,328
Knappe et al.  [45] Dec. 30, 1975

[54] DOCUMENT TRANSPORT DEVICE

[75] Inventors: LaVerne Frank Knappe, Rochester; Lee Philip Sapetta, New Brighton; Gary John Stroebel; Myron Arden Wilke, both of Rochester, all of Minn.

[73] Assignee: International Business Machines Corporation, Armonk, N.Y.

[22] Filed: Apr. 5, 1974

[21] Appl. No.: 458,493

[52] U.S. Cl. .............................. 271/267; 271/268
[51] Int. Cl.² .......................................... B65H 5/16
[58] Field of Search ............ 271/42, 266, 267, 268, 271/272; 198/218

[56] References Cited
UNITED STATES PATENTS

| 2,668,706 | 2/1954 | Benson | 271/42 |
|---|---|---|---|
| 3,265,195 | 8/1966 | Ford | 198/218 |
| 3,612,514 | 10/1971 | Schweihs et al. | 271/266 |
| 3,744,789 | 7/1973 | Kolibas | 271/42 |
| 3,747,921 | 7/1973 | Knappe | 271/42 |

Primary Examiner—Evon C. Blunk
Assistant Examiner—Robert Saifer
Attorney, Agent, or Firm—Robert W. Lahtinen

[57] ABSTRACT

The document transport device includes an elastomer coupler element with a distal end surface confronting a document path to impart motion to a document. The elastomer element is flexure mounted so that excitation of the associated electromechanical transducer provides an oscillatory vibratory motion as a periodic rotation and translation which induces an elliptical procession of the coupler end surface confronting the document path to impart motion to the document. In an environment where the documents have uniform drag load, operation near the no-load resonant frequency produces the optimum efficiency and minimum power consumption. Where widely varying document drag loads are encountered, operation at a frequency less than but approaching the stall load resonant frequency is used to provide more nearly uniform velocities. An increase in document drag load, which usually accompanies or causes a reduction in velocity, causes an increased driving force to be exerted resulting in a self-compensating mode of operation.

11 Claims, 6 Drawing Figures

DOCUMENT TRANSPORT DEVICE

BACKGROUND OF THE INVENTION

The present invention pertains to document transport devices and more particularly, to an improved modular document transport system.

A document transport using an elastomer coupler element to impart document motion without the use of conventional rotary motor driven drive rolls, belts and other mechanisms is shown in U.S. Pat. No. 3,747,921, assigned to the same assignee. In that device, the elastomer coupler is excited to produce an elliptical motion imparting procession of the drive surface which performs the driving function.

Data processing machines have wide varieties of document handling requirements. These requirements can include document position or velocity or both; variable document size, weight, shape and condition; variable drag force and/or inertia load; at ranges or tolerances of any or all of the above conditions. The document handling capabilities of the transport devices of the present invention are variable. One device configuration can cover ranges of document handling requirements by changing its operating conditions such as operating frequency, armature amplitude and device orientation.

The structure of the present device includes parallel flexure elements which mount the elastomer coupler element and cause a combination of rotation and translation to be applied to the coupler element as the electromechanical transducer generates an oscillatory driving action upon excitation. In addition, by operating the transport device as shown herein at a frequency between a crossover frequency (where the driving armature amplitude of motion at a no-load condition is equal to that at a stall load condition) and the stall load resonant frequency (where the amplitude of the drive armature motion is at a maximum during a document stall condition) a self compensating driving force is achieved. In this state, as the document drag is increased the driving force is increased which enables a more uniform velocity to be maintained when documents are transported which present widely varying loads to the system. Also, since the drive mechanism is in cyclical or intermittent driving engagement with the document, a transport system can utilize the period of relaxation or free flight to advantage such as with light documents. Where it is desired to have continuous control, the system can be driven with adjoining devices out of phase to effect continuous engagement.

It is an object of this invention to provide an improved modular document transport. It is a further object of this invention to provide a document transport with increased reliability and fewer modes of failure. It is a further object of this invention to provide a document transport with increased performance by imparting a combined rotational and translational motion to the elastomer drive elements. It is also an object of this invention to provide a transport with drive compensation for varying document drag loads and it is also an object to provide a modular document transport system that can provide either continuous or intermittent document drive.

DETAILED DESCRIPTION

Figure 2:
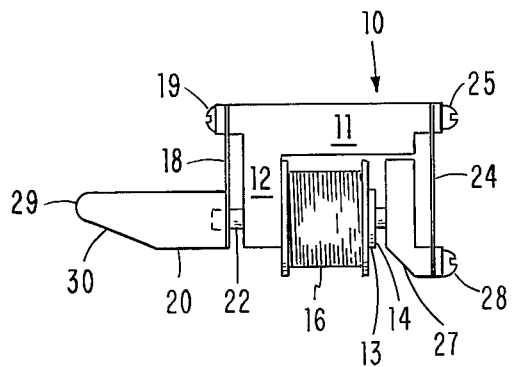
FIG. 2 is a side elevation of a single document transport device of FIG. 1.

In the side elevation of a single document transport device as shown in FIG. 2, a base or frame 10 of soft magnetic material has a generally U-shaped configuration with laterally extending portion 11 from which downwardly extends a first projection portion 12. A second projection portion 13 forms the second, parallel leg of the U-shaped configuration which is surrounded by a coil 16 and terminates as a pole face 14. Accordingly base or frame 10 forms the major portion of the magnetic circuit for the electromagnetic linear actuator. A front flexure mounting member 18 is secured by a bolt 19 to base 10 at one end and adjacent the opposite end has secured thereto an elongated elastomer element 20. The second projection portion 13 has a longitudinal bore through which extends a rod 22 of non-magnetic material such as aluminum. A rear flexure member 24 is secured to base 10 by a bolt 25 and to an armature 27 by a bolt 28. The rod 22 is rigidly connected to armature 27 and at its opposite end projects both through the front flexure 18 and into the elastomer member 20 to which it is bonded.

Figure 5:
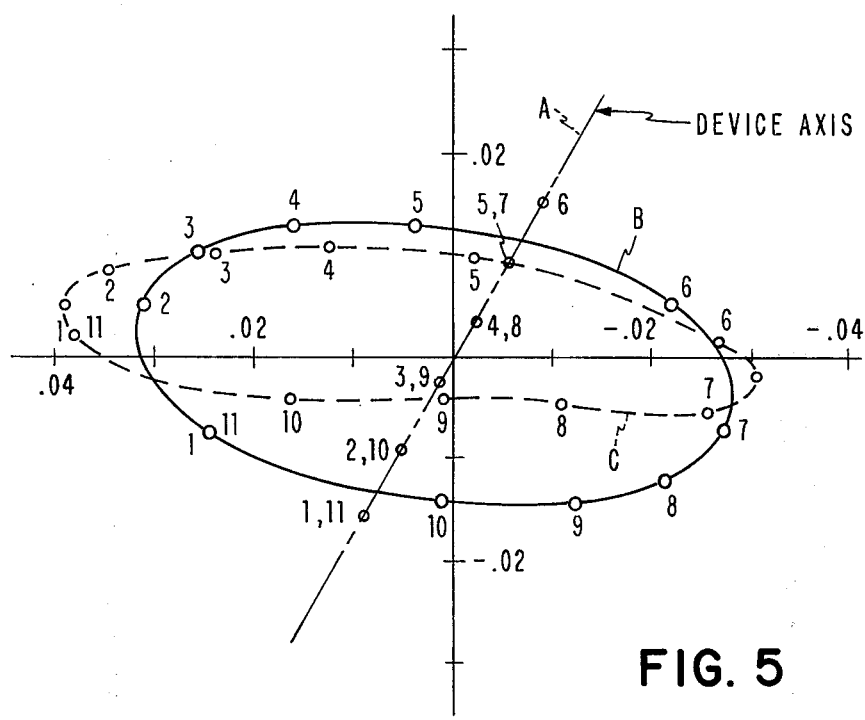
FIG. 5 is a graph showing the generally elliptical path of the excited elastomer element tip during unconstrained and document drive conditions.

In the device of FIG. 2, the unsymmetrical elastomer element 20 comprises the entire mechanical drive train and motion transformer. The elastomer element 20 is generally cylindrical in configuration and tapered toward the distal end surface 29 by an intersecting planer surface 30. The end surface 29 is cylindrical to provide tangential line contact with a cooperating surface or document. The output motion of the linear actuator is transformed into an elliptical motion at the distal free tip end surface 29 of elastomer element 20. When this tip end 29 is brought into contact with a document in the proper orientation, a unidirectional motion is imparted to the document. This is effected by a continuing sequence of contact, drive, lift-off and return which is repeated at the operating frequency of the device. The elliptical tip motion is illustrated in FIG. 5. The angle of inclination of the elastomer element axis shown by line A orients the elliptical motion so that the major axis is substantially aligned with the document path as indicated by the horizontal axis of the graph. The line B shows the almost uniform elliptical motion of the elastomer element tip when unconstrained. The closed curve of line C illustrates the truncated elliptical motion that occurs when the tip is constrained by contact with the document and the resilient system of the device is subject to compression.

Figure 4:
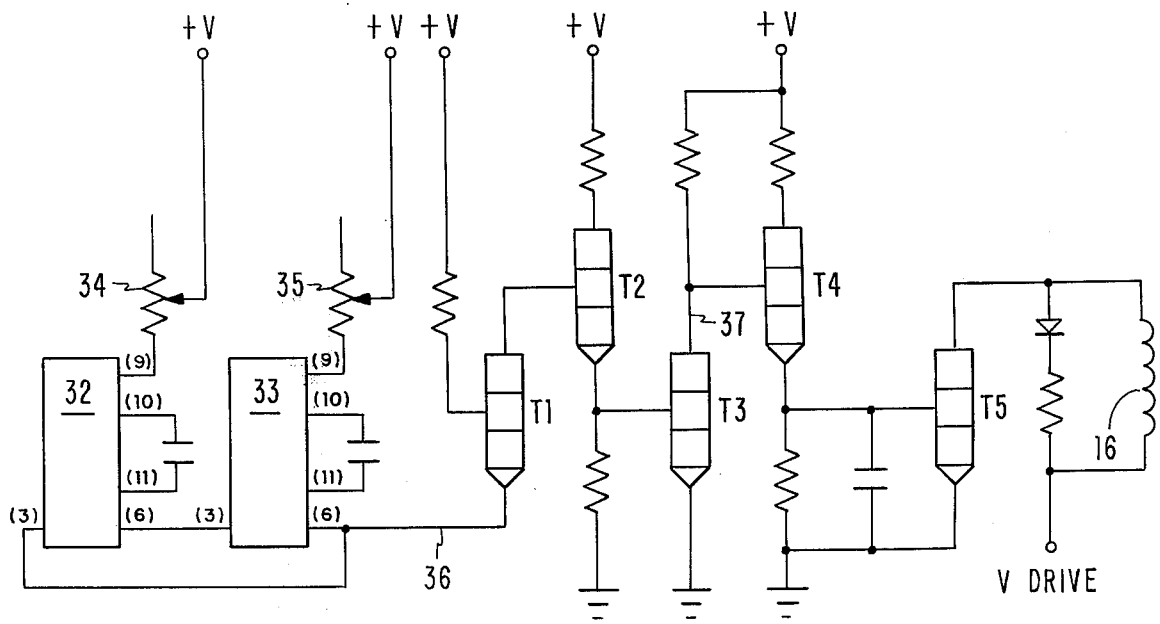
FIG. 4 is a diagram illustrating a circuit for exciting the coil of the transport device.

The document transport device is driven by excitation coil 16 with a circuit as shown in FIG. 4. An oscillating signal is provided by two single shots 32 and 33 which are connected in series. Each of the devices 32 and 33 generates an output pulse which is triggered by a negative going signal and each output pulse is of variable duration in response to the value of the variable resistance 34 or 35. Use of the two variable pulse with single shot devices 32 and 33 permits both the duration of coil excitation and the excitation frequency to be varied and adjusted. The details of the single shot devices 32 and 33 are described in "The TTL Data Book For Design Engineers" First Edition, copyright 1973 by Texas Instruments Incorporated at page 82. The circuit portion including transistors T1, T2 and T3 provides at line 37 the inverted output of the oscillator at line 36. As the base input of transistor T4 becomes positive and negative the base input of transistor T5 also is respectively positive and negative. As transistor T5 becomes conductive current is driven through the drive coil 16 and when transistor T5 becomes nonconductive, current through coil 16 is interrupted.

Figure 1:
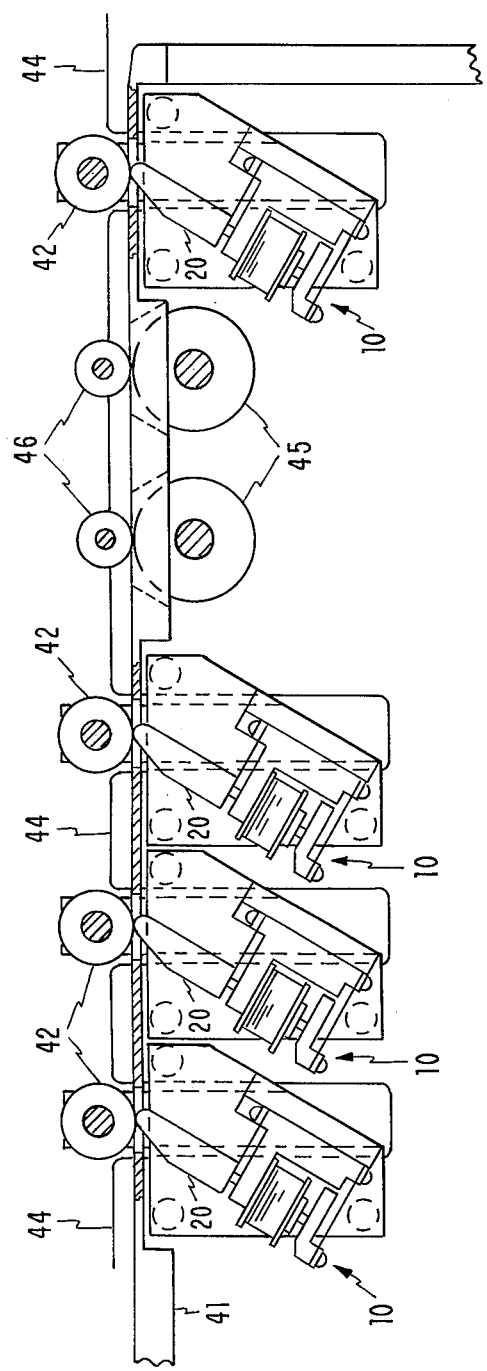
FIG. 1 is a side elevation partially broken away of a machine document transport system using a series of the motorless transport devices of the present invention.

Referring to FIG. 1, a document handling apparatus is illustrated wherein a bedplate surface 41 defines a horizontal document path. The document transport devices 10 each are mounted with the axis of the elastomer element 20 inclined to the path of document travel. Each of the elastomer drive elements 20 cooperates with an idler roll 42 with which it comes into intermittent driving contact. The series of lines of tangential contact between the elastomer elements 20 and the idler rolls 42 define a surface or document transport path. The document path is laterally confined by the side wall portions 44. Rolls 45 and the cooperating idler rolls 46 are shown for the purpose of illustrating a work station positioned along the transport path. Each of the individual transport devices 10 are mounted at an angle inclination with respect to the document path to substantially the major axis of the elliptical tip motion with such document path to optimize the length of driving engagement during each cycle.

Figure 3:
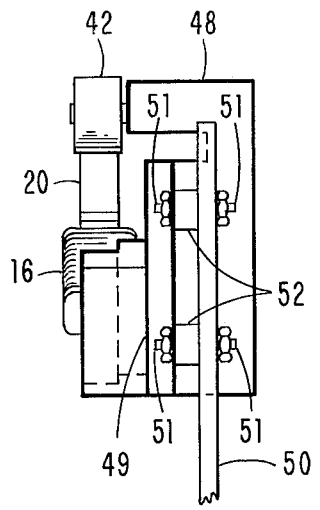
FIG. 3 is an elevation view illustrative of the shock mounting of a transport device on a machine frame.

FIG. 3 shows the shock mounting of the individual transport devices 10 on the associated machine frame. A bracket member 48 carries the transport device 10, of which the coil 16 and elastomer element 20 are visible, and the cooperating idler roll 42. The shock mounting is effected by connecting bracket flange 49 and machine side frame 50 with elastomeric mounting members each having a pair of bolts 51 which are secured to and separated by an intermediate elastomeric mounting element 52.

Four resonant frequencies are of particular importance with respect to operation of the transport device. They are the free resonant frequency, the idle resonant frequency, the stalled resonant frequency and the transverse resonant frequency of the elastomer element. The free resonant frequency occurs at that frequency which produces the maximum armature amplitude when no motion constraints are applied to the tip 29 of the elastomer element 20. The idle resonant frequency refers to the no-load resonance. For this condition the elastomer tip motion is constrained by a document which causes little or no drag load. The idle resonant frequency is slightly higher than the free resonant frequency. As the drag load on the document is increased, the resonant frequency of the transport device increases. This result is essentially due to the increase in the effective axial stiffness of the elastomer element 20 induced by the presence of a document. When the drag load is sufficient to inhibit document motion, the resonant frequency of the transport device is at the stalled resonant frequency. The difference between the idle resonant frequency and the stalled resonant frequency is related to the axial stiffness of the elastomer element 20. Under certain conditions there are advantages in operating the transport device near the stalled resonant frequency; however, operating a transport device off idle resonance requires more power and is less efficient. Also, the maximum driving force that the transport device can produce is proportional to the axial stiffness in the elastomer element for a given armature amplitude. For best operating efficiency, the idle and stalled resonant frequencies should be together and yet for maximum drive force, these two frequencies should be far apart. Accordingly the selection of the operation frequency and the axial stiffness of the elastomer element must be selected to accommodate the requirements of a particular application.

Figure 6:
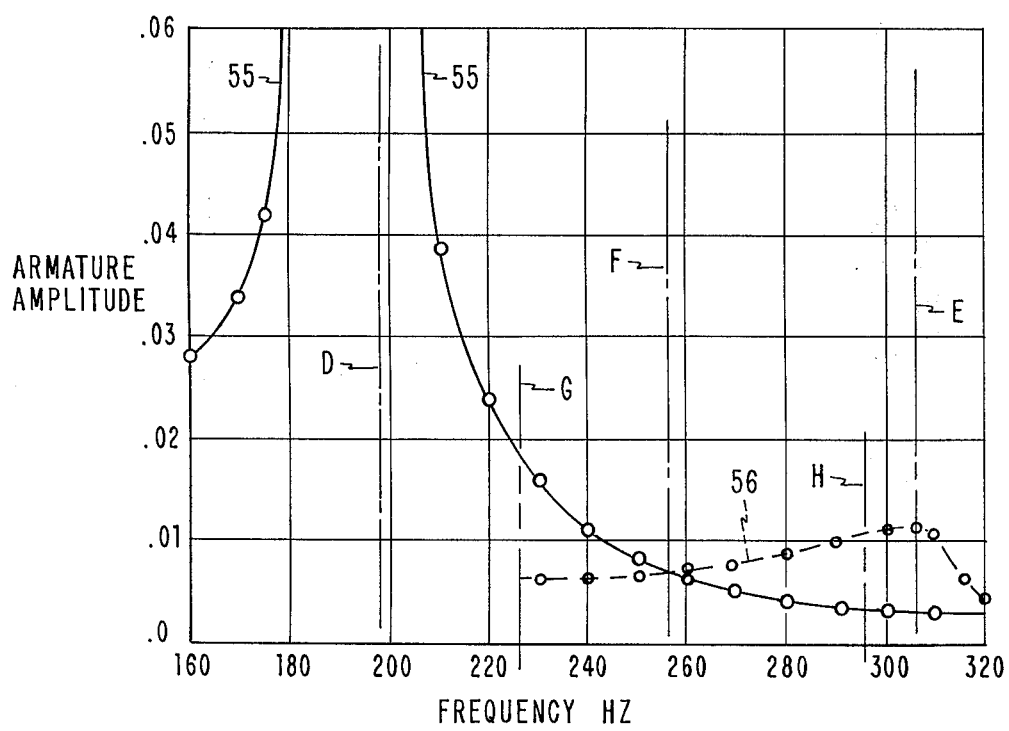
FIG. 6 is a graph showing armature amplitude at various frequencies under no-load and stall load conditions.

Another important frequency related to transport device operation is what is identified as the crossover frequency. This frequency falls between the idle and stalled resonant frequencies of the transport device and is that frequency at which the armature amplitudes are identical under no-load and stall load conditions. When the transport device is operated at a frequency below the crossover frequency and above the idle resonant frequency, the armature amplitude decreases as the load progresses from a no-drag load to the stall drag load. If the operating frequency is above the crossover frequency and below the stalled resonant frequency, the armature amplitude increases when going from a no-drag load to the stall drag load. By operating the transport device above the crossover frequency one can provide automatic compensation in drive force for variations in drag load. The maximum drive force capability occurs when the transport device operates at its stalled resonant frequency. FIG. 6 contains a typical no-drag load response curve 55 and a stall drag load response curve 56 for the transport device armature. The idle resonant frequency D and the stalled resonant frequency E of the device correspond to the peaks of these two curves. The crossover frequency F is at the intersection of the two response curves. When operating below the crossover frequency F, as for example frequency G, the armature amplitude decreased when going from the no-load curve to the stall load curve. Just the opposite occurs when operating above the crossover frequency, as at a frequency H.

The linear actuator of the transport device provides a translational and rotational motion to the fixed end of the elastomer element adjacent flexure 18. This motion is transformed into an elliptical motion at the free end 29. The shape and orientation of the ellipse defined by the motion of the free end is dependent upon the driving frequency, the material properties and dimensions of the elastomer element. The relationship of the driving frequency to the first transverse resonant frequency of the elastomer element is important. Generally, if the tranverse resonance is higher than the driving frequency, the elastomer element is too stiff and has a tendency to drag on the return motion. The other extreme is when the transverse resonance is lower than the driving frequency. When the elastomer element is too flexible, the tip is moving in the wrong direction at time of contact. When the driving frequency and the transverse resonant frequency are nearly alike the proper driving action is obtained. FIG. 5 shows this type of tip motion which has the proper lift-off and contact velocity. Both the free ellipse B and the truncated ellipse C due to document constraint are shown.

The transport device provides an intermittent drive to the document. Therefore there is a period during each cycle in which the document is in free flight. The document mass and drag force both effect the average document velocity. The document stops in free flight when the ratio of drag force to document momentum and lift-off becomes large. The transport device has a peculiar driving action during stalled conditions. With the coefficients of friction between the elastomer tip and the document usually encountered, the elastomer element backs up until it remains in continual contact with the document. The entire armature amplitude motion is then taken up in compression of the elastomer element.

Where a relatively uniform velocity is required in a document transport there are design arrangements which can improve transport performance. An easy modification is to operate alternate transport devices in a document transport out of phase. This essentially eliminates the free flight of the document when two or more transport devices are driving.

While the invention has been particularly shown and described with reference to a preferred embodiment thereof, it will be understood by those skilled in the art that various changes in form and details may be made therein without departing from the spirit and scope of the invention.

What is claimed is:

1. A document transport device for moving a document along a document path comprising
    a base member;
    a flexure mounting means supported by and extending from said base member;
    an elongated elastomer member supported at one end on said flexure mounting means and presenting a surface adjacent said end opposite said one end in confronting relation to said document path; and
    electromechanical transducer means including a nonmagnetic rod member connected to said flexure mounting means and said elastomer member adjacent said one end thereof, an armature element attached to said rod member in axially spaced relation to said elastomer member, said coil means surrounding said rod member intermediate said armature and said elastomer member;
    said electromechanical transducer means being connected to said elastomer member at said one end for imparting an oscillatory vibratory motion as a periodic rotation and translation of said elongated elastomer member, whereby said surface adjacent the end opposite said one end is induced to process through a generally elliptical path to induce motion of a document disposed between said surface and said document path.

2. The document transport device of claim 1, wherein said elongated elastomer member is reduced in cross section from said one end toward said end opposite said one end.

3. The document transport device of claim 2, wherein said elongated elastomer member surface is formed as a curved surface with the axis of curvature transverse to the direction of document travel as induced by the elliptical path of travel of said surface, whereby said surface makes initial tangential line contact with such document.

4. The document transport device of claim 1, further comprising control means for periodically energizing said coil at a frequency exceeding a crossover frequency and approaching but less than a stall load resonant frequency where said crossover frequency is that operating freqeuency where the amplitude of armature motion under a no-load condition is equal to the amplitude of armature motion when a document disposed between said surface and said document path is restrained in a stationary position and said stall load resonant frequency is that frequency at which the amplitude of armature motion is maximum when a document disposed between said surface and said document path is restrained in a stationary position.

5. A document transport device for moving a document along a device surface which defines a document path comprising
    a base member;
    a pair of parallel spaced flexure mounting means each supported by and extending from said base member;
    an elongated elastomer member connected at one end to the first of said parallel flexure mounting means at a surface facing away from the second of said parallel flexure mounting means;
    said elongated elastomer member presenting a surface at the distal end thereof in confronting relation to said device surface;
    rigid interconnecting means secured to said elongated elastomer member and to the second of said pair of said parallel flexure mounting means; and
    electromechanical transducer means for imparting to said elongated elastomer member an oscillatory vibratory motion as a periodic rotation and translation which causes said elastomer member surface to process through an elliptical path and propel a document disposed between said elastomer member surface and said device surface along said document path.

6. The document transport device of claim 5, wherein said rigid interconnecting means and said electromechanical transducing means comprise an armature which forms a portion of said rigid interconnecting means and an electromagnet member disposed to attract said armature when said electromagnet is energized.

7. The document transport device of claim 6, further comprising control means for periodically energizing said electromagnet member at a frequency exceeding a crossover frequency but less than the stall load resonant frequency wherein said crossover frequency is that operating frequency where armature motion under a no-load condition is equivalent to armature motion when a document positioned between said elastomer element surface and said device surface is restrained against movement.

8. A document transport device for moving a document along a device surface defining a document path comprising:
    a base member having a laterally extending portion and a projection having a first portion extending generally perpendicularly from said laterally extending portion and a second portion extending from said first postion generally parallel to said laterally extending portion;
    a pair of laterally spaced parallel flexure mounting members each supported by and extending from said base member;
    an elongated elastomer member connected at one end thereof to the first of said parallel flexure mounting members and at a surface of such parallel flexure mounting member which faces away from the second of said parallel flexure mounting members;

said elongated elastomer member having an end surface opposite said one end in confronting relation to said device surface;

an aperture through said second base member projection portion;

an armature secured to the second of said parallel flexure mounting members;

a rigid nonmagnetic rod extending through said aperture with one end connected to said elongated elastomer member and the other end connected to said armature;

a coil surrounding said second base member projection portion; and control means for periodically energizing said coil whereby said elastomer member end surface is caused to process through an elliptical path and propel a document disposed between said elastomer member end surface and said device surface along said document path.

9. The document transport device of claim 8, wherein said control means energizes said coil at a frequency exceeding a crossover frequency but less than the stall load resonant frequency wherein said crossover frequency is that operating frequency where the amplitude of armature motion under a no-load condition is equivalent to the amplitude of armature motion when a document disposed between said elastomer member surface and said device surface is restrained against movement and said stall load resonant frequency is that frequency at which armature amplitude is maximum when a document disposed between said elastomer member surface and said device surface is restrained against movement.

10. The document transport device of claim 9, wherein said elongated elastomer element tapers between the ends thereof and said elastomer element end surface is curved about an axis of curvature extending transverse to the direction of document travel along said document path.

11. A document transport comprising means defining a document path;

a plurality of document transport devices mounted sequentially along said document path at such intervals that a document in said document path continuously confronts at least one of said devices, said transport devices each including an elongated elastomer element with an end portion confronting said document path, said elastomer element being excitable to cause said end portion to process through a generally elliptical configuration to impart unidirectional motion to a document positioned in said path and confronting said elastomer element and an electromagnetic linear actuator including a moveable armature connected to said elastomer and operable to excite said elastomer element; and control means including oscillator means for periodically energizing said linear actuator at a selected frequency, said control means including circuit means for providing a signal to each transport device linear actuator at a frequency exceeding a crossover frequency and approaching but less than a stall load resonant frequency where said crossover frequency is that operating frequency where the amplitude of armature motion under a no-load condition is equal to the amplitude of armature motion when a document in said document path confronts said elongated elastomer member end surface and said document is restrained in a stationary position and said stall load resonant frequency is that frequency at which the amplitude of armature motion is maximum when a document disposed in said document path and confronting said elongated elastomer surface is restrained in a stationary position.

* * * * *

UNITED STATES PATENT AND TRADEMARK OFFICE
CERTIFICATE OF CORRECTION

PATENT NO. : 3,929,328

DATED : December 30, 1975

INVENTOR(S) : LaVerne F. Knappe, Lee P. Sapetta, Gary J. Stroebel and Myron A. Wilke It is certified that error appears in the above-identified patent and that said Letters Patent are hereby corrected as shown below:

Column 5, claim 1, line 43, "said", second occurrence, should read --and--.

Signed and Sealed this eighteenth Day of May 1976

[SEAL]

Attest:

RUTH C. MASON
*Attesting Officer*

C. MARSHALL DANN
*Commissioner of Patents and Trademarks*